(12) United States Patent
Mudd et al.

(10) Patent No.: US 8,724,184 B2
(45) Date of Patent: May 13, 2014

(54) VESSEL FOR SCANNING DOCUMENTS

(71) Applicants: Todd R. Mudd, Laguna Hills, CA (US); Nicholas A. Percival, Laguna Hills, CA (US)

(72) Inventors: Todd R. Mudd, Laguna Hills, CA (US); Nicholas A. Percival, Laguna Hills, CA (US)

(73) Assignee: JJNT, LLC, Laguna Hills, CA (US)

( * ) Notice: Subject to any disclaimer, the term of this patent is extended or adjusted under 35 U.S.C. 154(b) by 0 days.

(21) Appl. No.: 13/624,710

(22) Filed: Sep. 21, 2012

(65) Prior Publication Data

US 2013/0083370 A1 Apr. 4, 2013

Related U.S. Application Data

(60) Provisional application No. 61/538,452, filed on Sep. 23, 2011, provisional application No. 61/587,109, filed on Jan. 16, 2012.

(51) Int. Cl.
*H04N 1/04* (2006.01)
(52) U.S. Cl.
USPC ............ 358/474; 358/475; 358/471; 358/484

(58) Field of Classification Search
USPC .................................. 358/474, 475, 471, 484
See application file for complete search history.

(56) References Cited

U.S. PATENT DOCUMENTS

| | | | |
|---|---|---|---|
| 7,821,786 B2 * | 10/2010 | Hadad et al. ............. | 361/679.59 |
| 8,049,936 B2 * | 11/2011 | Chen et al. .................... | 358/474 |
| 2003/0210433 A1 | 11/2003 | Westcott | |
| 2007/0048012 A1 | 3/2007 | Hatzaw | |
| 2008/0151099 A1 * | 6/2008 | Lin et al. ....................... | 348/376 |
| 2009/0072142 A1 | 3/2009 | Blitzer | |
| 2009/0272779 A1 * | 11/2009 | Vu ................................ | 224/677 |
| 2011/0075228 A1 | 3/2011 | King | |
| 2012/0171656 A1 * | 7/2012 | Shen ............................. | 434/365 |

* cited by examiner

*Primary Examiner* — Houshang Safaipour
(74) *Attorney, Agent, or Firm* — Stout, Uxa, Buyan & Mullins, LLP; Donald E. Stout

(57) ABSTRACT

A method of scanning a document uses a document scanning device having a case which defines a cavity and has a docking location on a first side and a document platform on a second opposed side. The method includes steps of inserting an electronic image capturing device into the docking location, inserting a document to be scanned onto the document platform, activating a camera on the electronic image capturing device, and capturing an image of the document. Once the document image has been captured, the method may also include a further step of transmitting the image to another location, using a communications network.

13 Claims, 20 Drawing Sheets

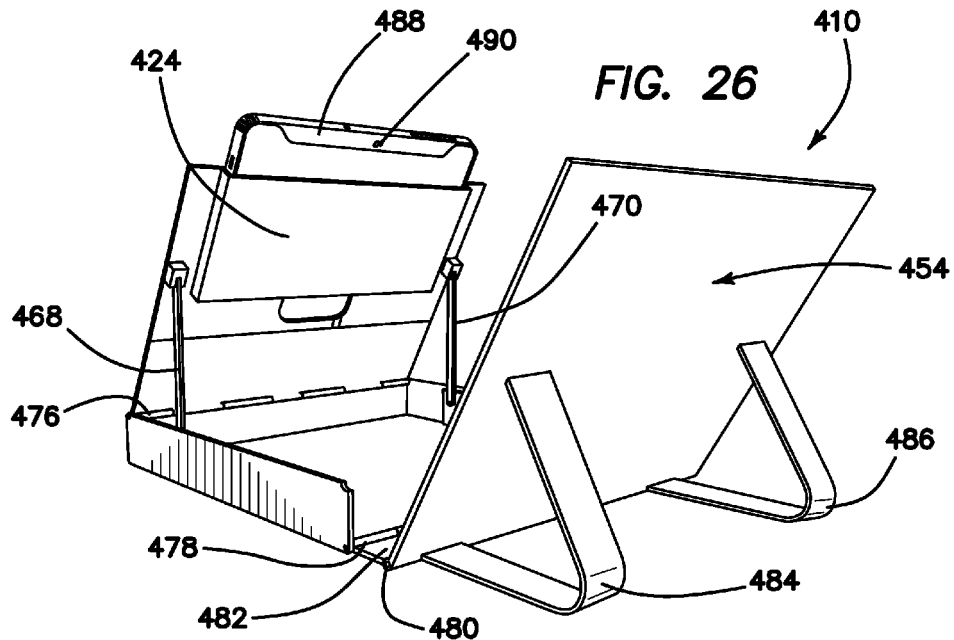
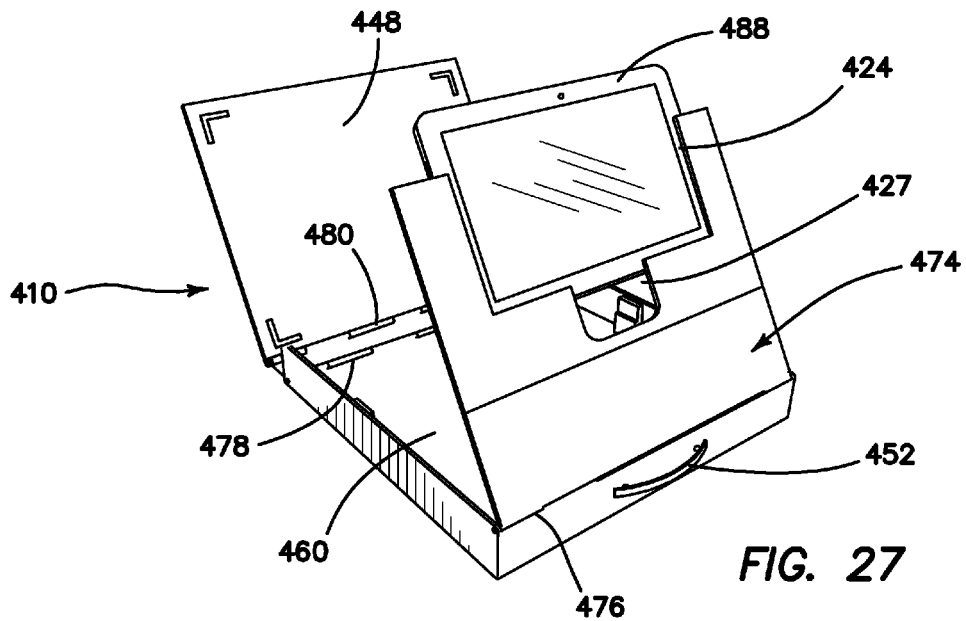

VESSEL FOR SCANNING DOCUMENTS

This application claims the benefit under 35 U.S.C. 119(e) of the filing date of Provisional U.S. Application Ser. No. 61/538,452, entitled Vessel for Scanning Documents, filed on Sep. 23, 2011, and also claims the benefit under 35 U.S.C. 119(e) of the filing date of Provisional U.S. Application Ser. No. 61/587,109, entitled Vessel for Scanning Documents, filed on Jan. 16, 2012. Both of these provisional applications are expressly incorporated herein by reference, in their entirety.

BACKGROUND OF THE INVENTION

Frequently, during the course of modern business, it is necessary to scan documents for electronic transmittal and/or storage. Document scanners are well known for this purpose, but they are not particularly portable. Therefore, it would be advantageous to be able to effectively use portable camera technology, such as that available in modern smart phones and tablet-style personal computers (tablet p.c.), to reliably and quickly scan documents.

SUMMARY OF THE INVENTION

The present invention addresses the foregoing concerns by providing, in one particular arrangement, a collapsible document scanning device which comprises a docking location for receiving and docking an image capturing device. The device further comprises a document platform spaced from the docking location for receiving a document to be scanned. A structure is provided for supporting each of the docking location and the document platform in spaced relationship to one another in an expanded, operable configuration, wherein the structure comprises a plurality of members which are movable to re-configure the structure from the expanded configuration to a collapsed configuration, in order to render the device inoperable and conveniently transportable or storable. A support plate adjacent to the docking location may be provided for supporting the image capturing device which has been inserted into the docking location.

The docking location comprises an aperture having a suitable size and shape for receiving the image capturing device. In some embodiments, the docking location comprises a detachable faceplate, wherein the detachable faceplate is adapted for ready attachment and detachment from the device. The detachable faceplate is particularly adapted for accommodation of a particularly configured image capturing device and is interchangeable with a differently configured detachable faceplate in the event a differently configured image capturing device is to be used.

The image capturing device may be any suitable such device, either now available or which might be available in the future. Typically, the device might comprise a tablet personal computer (p.c.). It could also comprise a smart phone, for example. Preferably, the image capturing device is capable of accessing a network for transmitting the images remotely, such as a phone network or a wi-fi network.

In certain embodiments, the structure of the document scanning device comprises a box or case having a front surface panel, a rear surface panel, a left surface panel, a right surface panel, a top surface panel, and a bottom surface panel, wherein the movable members comprise portions of some of the panels. In other embodiments, the structure is constructed to be open in the expanded configuration and the document platform comprises one of the movable members. In some of the open embodiments, the device further comprises movable support pillars for supporting the docking location in spaced relationship to the document platform in the expanded configuration. In others, hinges having stop points eliminate the need for such support pillars.

In the case of the collapsible embodiments, a handle may be provided for transporting the device when it is in its collapsed configuration, the handle becoming a support member in the expanded configuration for supporting the document platform.

In another aspect of the invention, there is provided a document scanning device which comprises a case comprising a plurality of side panels which define an interior cavity. A docking location is disposed on a first portion of the case, for receiving and docking an image capturing device. A document platform is disposed on a second portion of the case, spaced from the first portion, for receiving a document to be scanned by an image capturing device disposed in the docking location. In some embodiments, the document platform comprises a document insertion slot for receiving a document therein into the interior cavity, and further comprises a view plate adjacent to the document insertion slot for supporting a document inserted into the slot.

A support plate may be disposed adjacent to the docking location for supporting the image capturing device which has been inserted into the docking location. The docking location comprises an aperture having a suitable size and shape for receiving the image capturing device.

For the enclosed embodiments, artificial lighting may be provided in the interior cavity for enhancing the scanning function.

In still another aspect of the invention, there is provided a method of scanning a document using a document scanning device comprising a case which defines a cavity and has a docking location on a first side and a document platform on a second opposed side thereof. The inventive method comprises steps of inserting an electronic image capturing device into the docking location, inserting a document to be scanned onto the document platform, activating a camera on the electronic image capturing device, and capturing an image of the document. If an enclosed embodiment is being utilized, the inventive method may further comprise a step of lighting the cavity to improve the image quality. Once the document image has been captured, the method may also comprise a further step of transmitting the image to another location, using a communications network.

Additionally, in certain embodiments, the inventive method may also comprise a step of detaching a first docking location having a first configuration for accommodating an image capturing device having a first particular configuration, and then attaching a second docking location having a second configuration for accommodating an image capturing device having a second particular configuration. By providing a variety of differently configured detachable docking locations, customized to different available image capturing devices, the inventive system may be effectively utilized with most or all of those devices, in an optimal way.

The invention, together with additional features and advantages thereof, may best be understood by reference to the following description taken in conjunction with the accompanying illustrative drawing.

BRIEF DESCRIPTION OF THE DRAWINGS

FIG. 26 is an isometric view of the FIG. 23 embodiment from still another orientation;

FIG. 27 is an isometric view of the FIG. 22 embodiment from a different orientation;

DESCRIPTION OF THE PREFERRED EMBODIMENT

Figure 1:
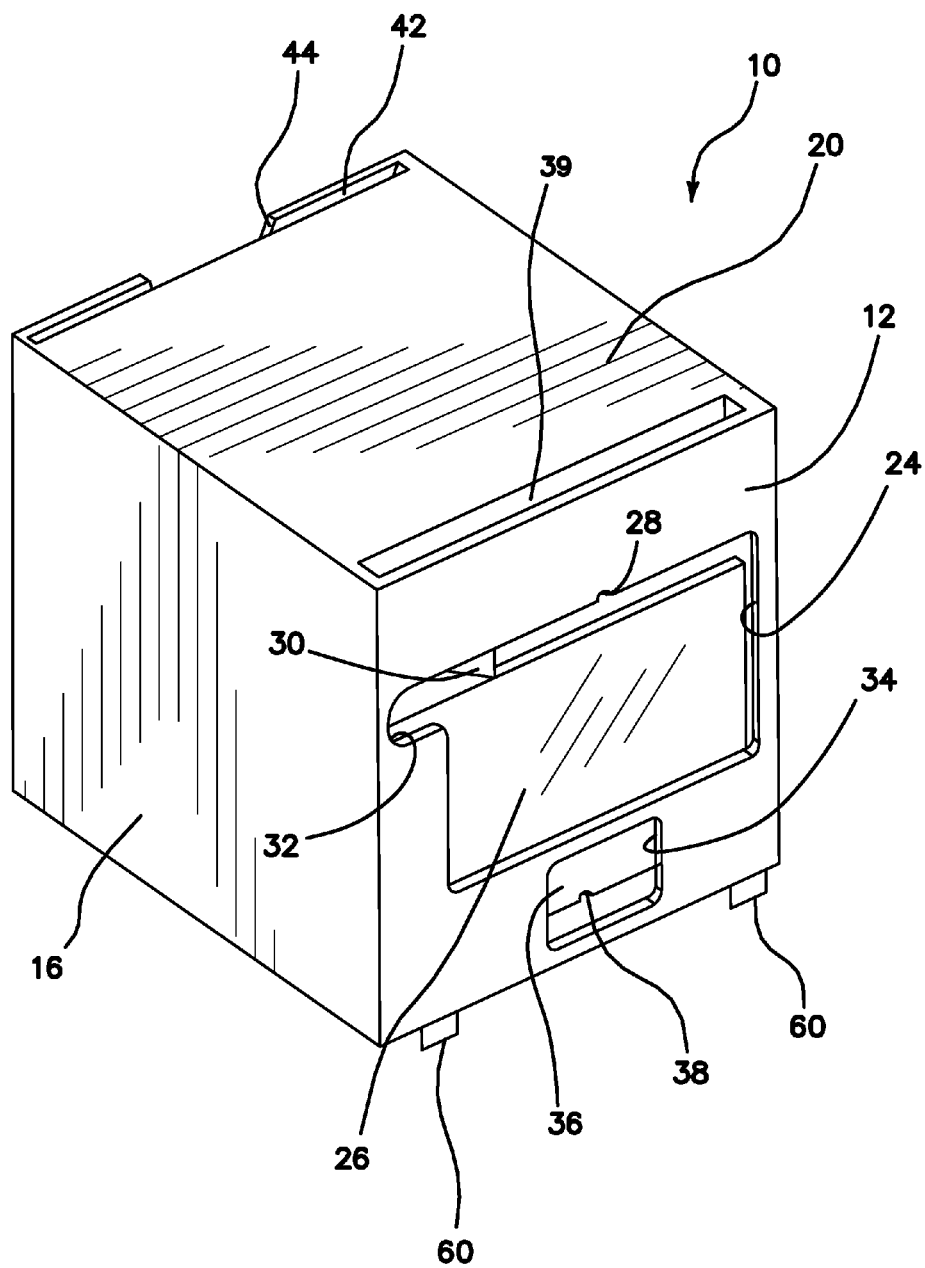
FIG. 1 is an isometric view of a document scanning system in accordance with one embodiment of the present invention.
Figure 2:
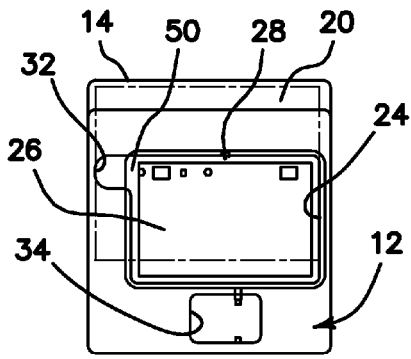
FIG. 2 is a front view of the device shown in FIG. 1.

Referring now more particularly to the drawings, there is shown in FIGS. 1-7 a representative embodiment of a document scanning device 10 constructed in accordance with the principles of the present invention. The device 10 comprises a box or case, having a front surface panel 12, a rear surface panel 14, a left surface panel 16, a right surface panel 18, a top surface panel 20, and a bottom surface panel 22.

In the front side 12 of the device 10 is disposed a docking location or aperture 24, for docking an electronic imaging device, such as a tablet personal computer (p.c.), smart phone, or similar device. Behind the docking location 24 is a support plate 26 for supporting the back surface panel of the tablet p.c. or other similar device when docked within the docking location 24. The tablet docking location is structured to ensure proper functionality of the rear scanning camera on the tablet device.

Other features on the front surface panel 12 of the device include a front-facing camera cut-out 28, which allows for additional photography or scanning or video conferencing using the front-facing camera of the tablet device, as well as a sound/speaker diverter 30, for increasing the effectiveness of the rear-facing speakers, and a multi-purpose cut-out 32. The multi-purpose cut-out 32 is adapted to allow access to the power button on the back side of the tablet, the portal for speaker sounds, and access to volume control buttons on the tablet device. A tablet accessory cut-out 34 is also disposed on the front surface panel 12, which may be useful for providing access to the tablet device's accessory jacks, transformer, power supply, and charger connection, as well as the microphone. Within the tablet accessory cut-out 34 may be positioned a cavity wall plate 36, for restricting access to electrical connections and the transformer/charger/power supply. A power supply/charger cord access port 38 may be provided at a lower edge of the cavity wall plate 36, as shown. Optionally, different interchangeable front surface panels may be provided for accommodating various tablet devices. In some embodiments, a top slot 39 (FIG. 1) may be provided through which the tablet device may be inserted and withdrawn.

Within the box comprising the device 10 is positioned one or more lights 40 at optimal locations for aiding in achieving the best possible scan quality/image. The top surface panel 20 is preferably removable so that access to the interior of the device 10 is readily achieved, for servicing the light, view glass, and the like. Adjacent to the rear surface panel 14 is a document insertion slot or platform for receiving and aligning a document or photo to be scanned. Cut-out 44 is provided to permit access for ready removal of the document or photo once the scanning process has been completed. A glass or plastic transparent view plate is disposed within the box, at a location identified by reference numeral 46 for supporting the document or photo on the document platform while it is being scanned. Vents 48 are provided in the rear surface panel 14 for ventilating the device 10.

In operation, as shown in FIGS. 2-7, when it is desired to scan a document, a tablet p.c. 50 or other suitable portable electronic device having a camera and Internet and/or Wi-Fi access is placed into the docking location 24, against the support plate 26. As shown, the power cord 52 of the electronic device 50 may extend downwardly and through the power supply/charger cord access port 38 in the cavity wall plate 36, so that it may be connected to a suitable power supply during the scanning operation. A document 54 to be scanned is placed into the document insertion slot or platform 42, as shown, so that it is in the imaging path of the camera on the imaging device disposed in the docking slot/location.

Figure 3:
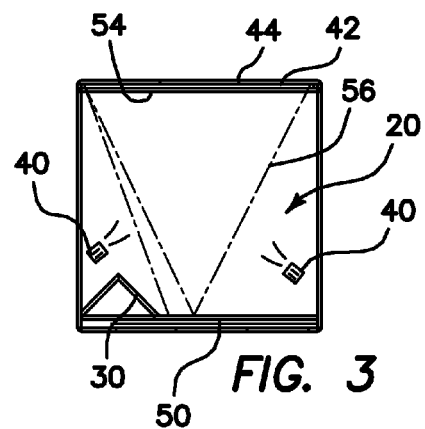
FIG. 3 is a top view of the device shown in FIGS. 1-2.
Figure 4:
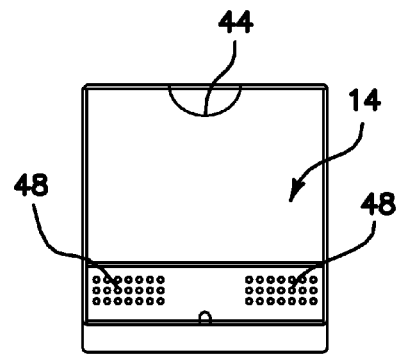
FIG. 4 is a rear view of the device shown in FIGS. 1-3.
Figure 5:
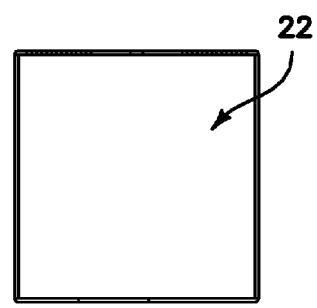
FIG. 5 is a bottom view of the device shown in FIGS. 1-4.
Figure 6:
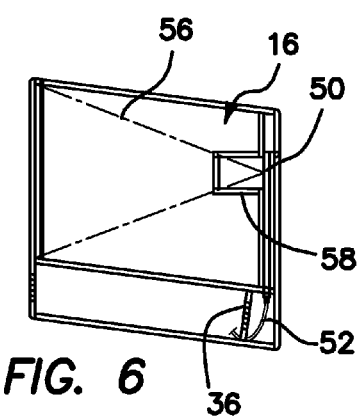
FIG. 6 is a left-side view of the device shown in FIGS. 1-5.
Figure 7:
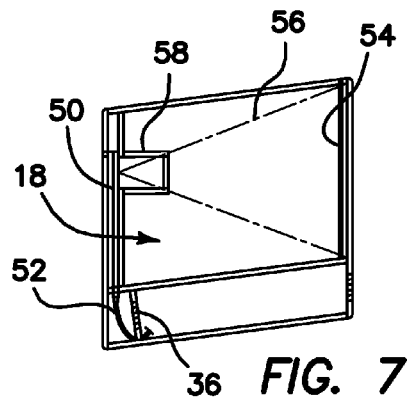
FIG. 7 is a right-side view of the device shown in FIGS. 1-6.

An image beam 56 is illustrated in FIGS. 3, 6, and 7, extending from the edges of the document 54 back into the lens of the rear-facing camera on the imaging device. A focusing chamber 58 assists in sharply focusing the image of the document for the camera.

Feet 60, preferably adjustable, may be provided for supporting the device 10, if desired. Additionally, as is illustrated particularly in FIG. 2, the front of the device 10 is preferably tilted back, to assist in viewing the tablet if placed on a surface or table. This feature aids in the proper scanning and alignment of documents.

Once the scanning operation has been completed, by activation of the camera to record a photograph of the document to be scanned, the imaging device may be removed from the docking location and the scanned document, stored as a photo in the memory of the imaging device, may be suitably archived in the imaging device, or transmitted, using a communications network, such as a telephone or wi-fi connection, to another location for archiving.

The device may be constructed to be collapsible, if desired, for easy portability and storage. In FIGS. 8-12 there is shown another modified embodiment of a document scanning device 110 constructed in accordance with the principles of the present invention. This document scanning device 110 is similar in all respects other than those specifically delineated herein to the document scanning device 10 shown in FIGS. 1-7. The device 110 comprises a box or case, having a front surface panel 112, a rear surface panel 114, a left surface panel 116, a right surface panel 118, a top surface panel 120, and a bottom surface panel 122.

In the front side 112 of the device 110 is disposed a docking location or aperture 124, for docking an electronic imaging device, such as a tablet personal computer (p.c.), smart phone, or similar device. Behind the docking location or station 124 is a support plate 126 for supporting the back surface panel of the tablet p.c. or other similar device when docked within the docking location 124. The tablet docking location is structured to ensure proper functionality of the rear scanning camera on the tablet device.

Other auxiliary features, as are disclosed in the prior application, may also be included, but are not shown herein for the sake of simplicity.

Figure 8:
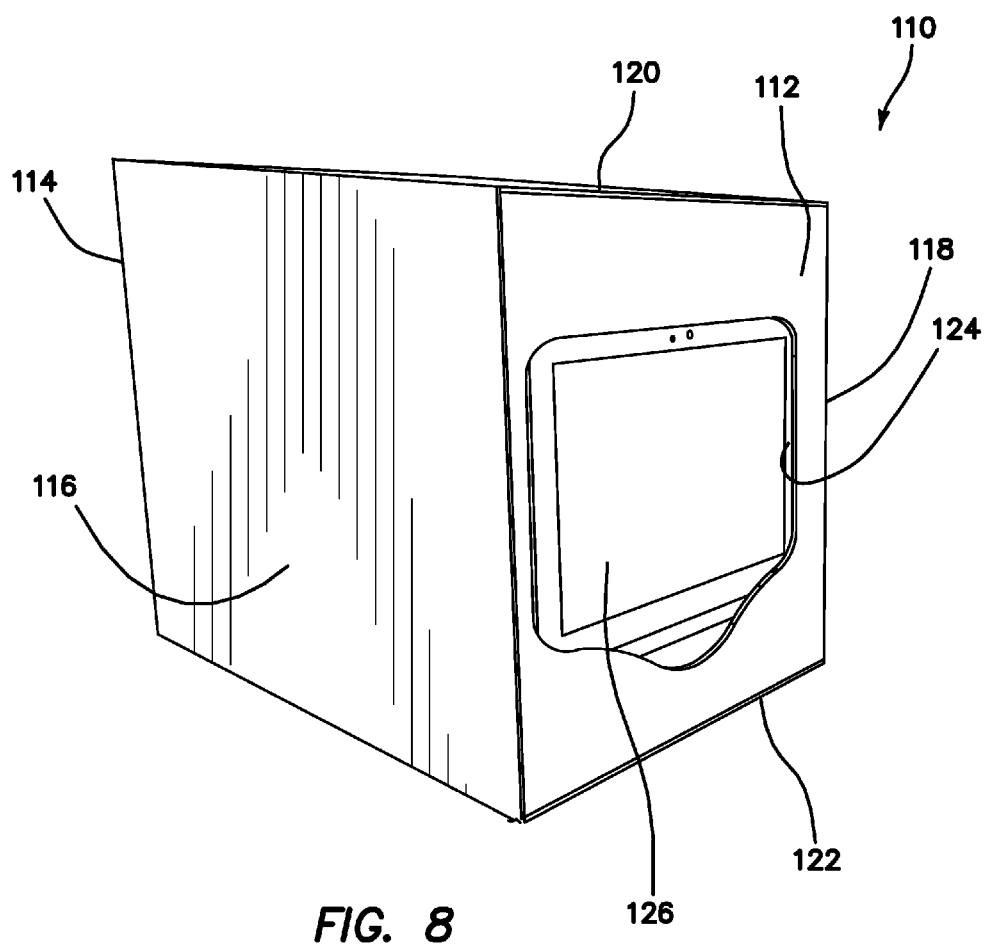
FIG. 8 is an isometric view of a document scanning system in accordance with a second modified embodiment of the present invention, wherein the embodiment is in an expanded orientation.
Figure 9:
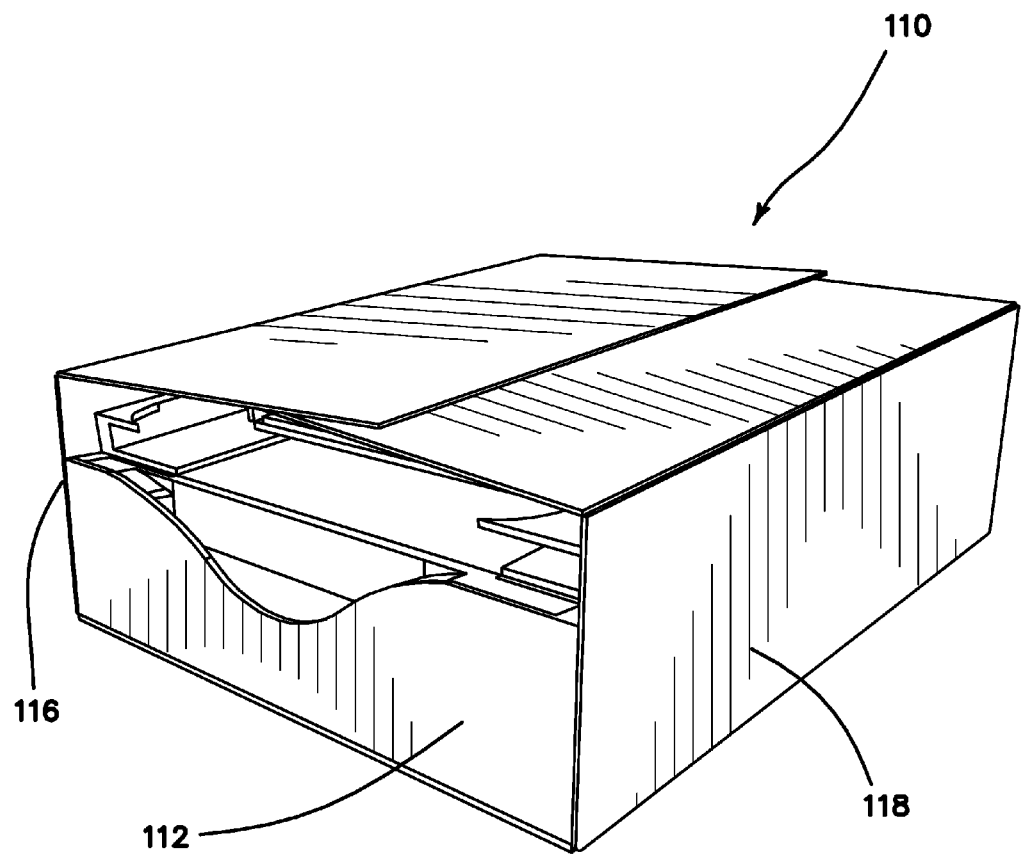
FIG. 9 is an isometric view similar to FIG. 8, showing the embodiment of FIG. 1 in a collapsed orientation.

The primary difference between the embodiment of FIG. 8 and the device disclosed in FIG. 1 is that the device 110 is collapsible. Specifically, in FIG. 8 the device 110 is shown in its fully expanded, usable configuration or orientation, while in FIG. 9, the device 110 is shown in its collapsed orientation, whereby it may be readily transported or stored.

Figure 10A:
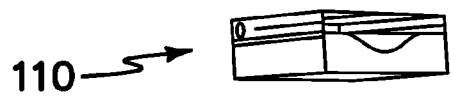
FIGS. 10a-10f illustrate a sequence wherein the embodiment of FIGS. 8 and 9 is expanded from its collapsed orientation to its fully expanded orientation.
Figure 10B:
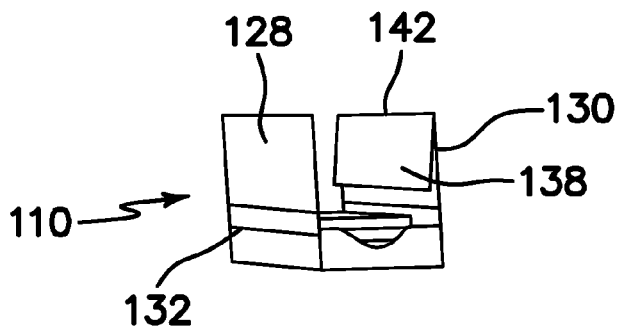
Figure 10C:
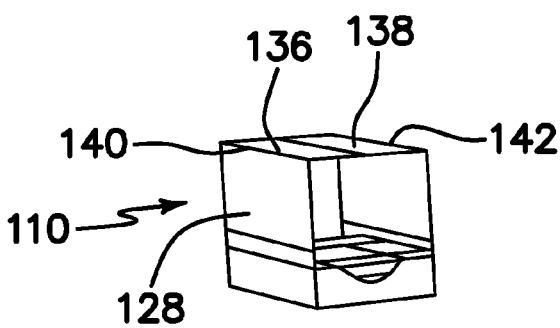
Figure 10D:
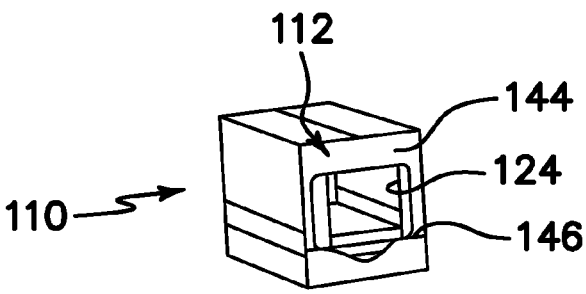
Figure 10E:
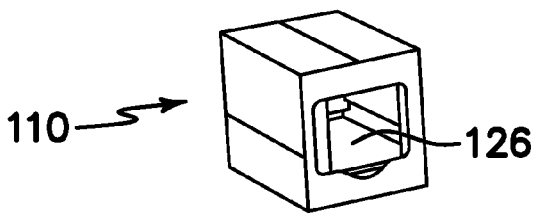
Figure 10F:
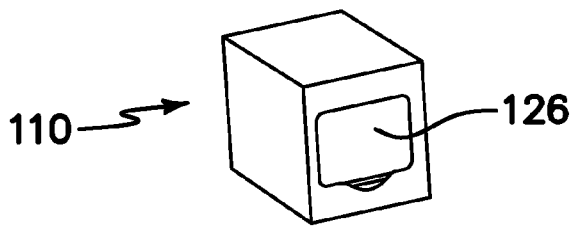
Figure 11:
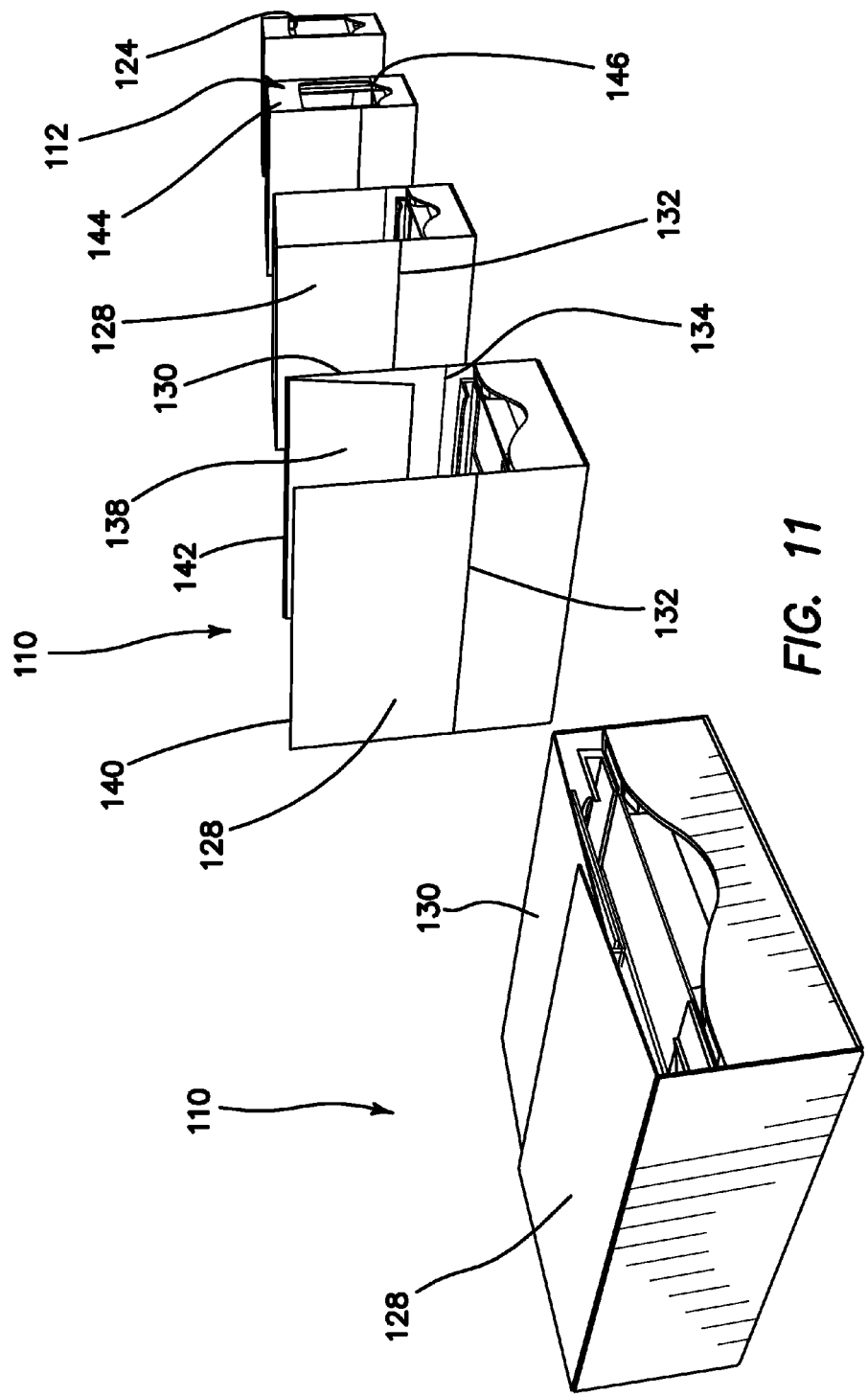
FIG. 11 is an isometric sequence showing the expansion of the FIGS. 8 and 9 embodiment from its collapsed orientation to its fully expanded orientation.

FIGS. 10a-10f, 11, and 12 illustrate the steps required to collapse or expand the device 110. More particularly, FIG. 10a and the left-most figure in FIG. 11 depict the device 110 in its collapsed configuration. To expand the device 110 to its operational, expanded configuration, a first step is to lift the flaps 128, 130 about hinge lines 132, 134, respectively (FIG. 10b and the second figure in FIG. 11). The next step is to pivot flaps 136, 138 about respective hinge lines 140, 142 (FIG. 10c and the third figure in FIG. 11) to enclose the top of the device 110. At this juncture, a front flap 144 is folded upwardly about a hinge line 146 (FIG. 10d and the fourth figure in FIG. 11), to form the front surface panel 112 and the docking location 124. In FIG. 10e, a rear flap (not shown) is similarly folded upwardly to form the rear surface panel 114, while in FIG. 10f, another flap is folded upwardly to form the support plate 126.

Figure 12:
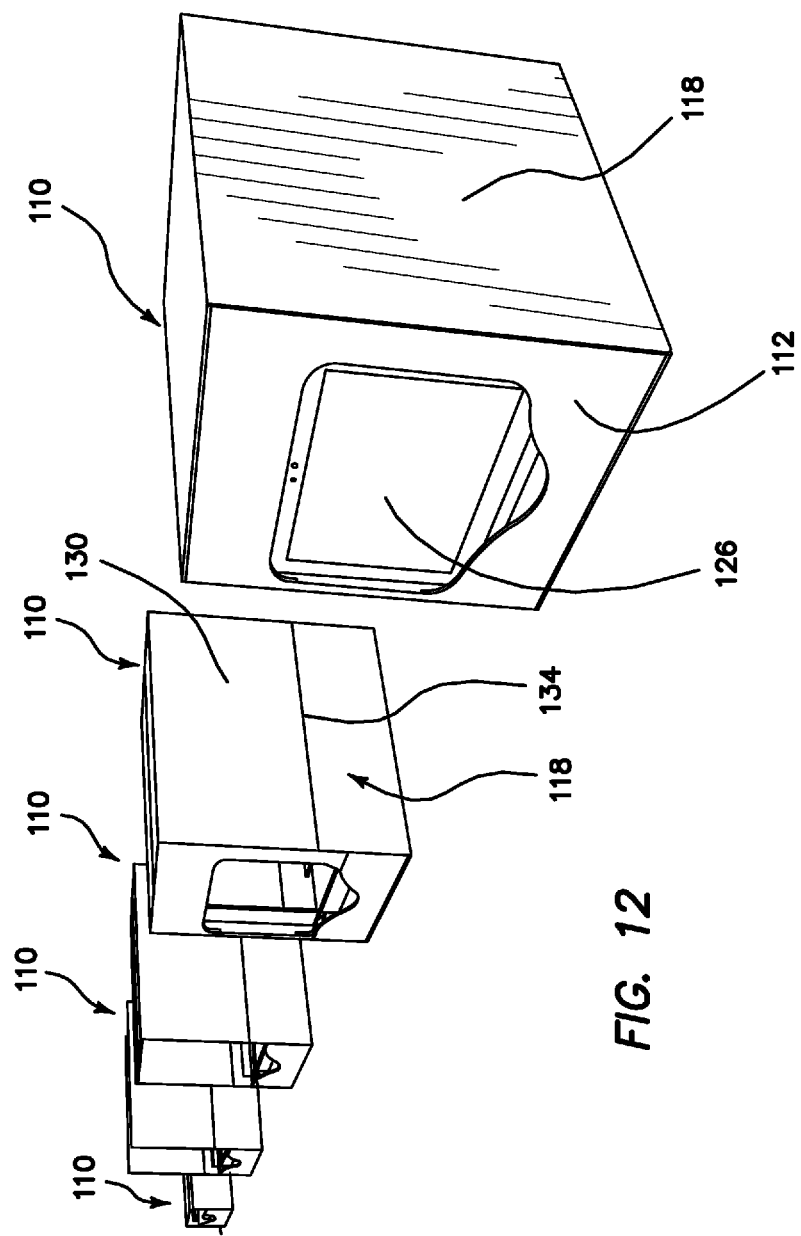
FIG. 12 is an isometric sequence similar to FIG. 11, but showing the collapse of the FIGS. 8 and 9 embodiment from its fully expanded orientation to its collapsed orientation.

FIG. 12 illustrates the same process shown in FIGS. 10 and 11, but in reverse order, thereby collapsing the expanded device 110, shown in the right-most figure, in steps, to the collapsed version shown in the left-most figure.

A third modified embodiment of the document scanning device 210 of the present invention is illustrated in FIGS. 13-18, wherein common elements to those in the second embodiment are identified by common reference numerals, preceded by the numeral "2", rather than "1". One difference between this embodiment and that of FIGS. 8-12 is that the FIGS. 8-12 embodiment is particularly suitable for low-light environments, because lighting may be provided within the device 110. In the FIGS. 13-18 embodiment, adequate ambient lighting is assumed, partially because of its open construction, so no artificial light source is provided.

Figure 13:
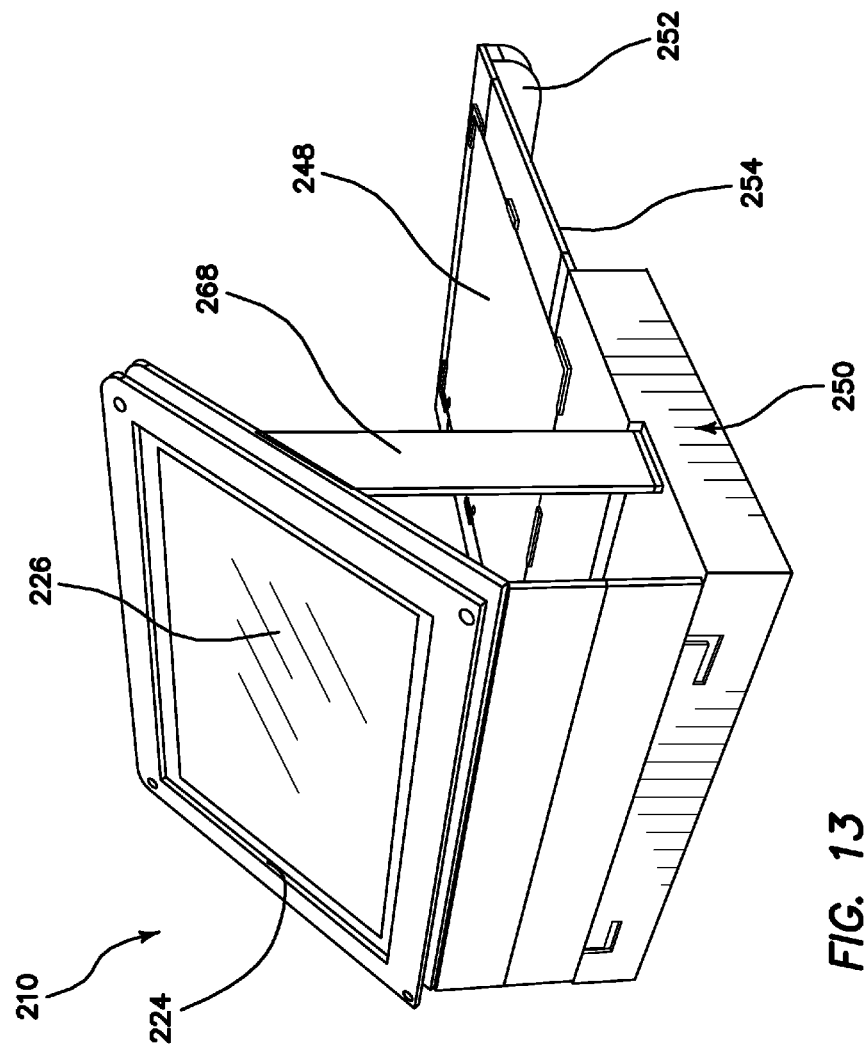
FIG. 13 is an isometric view of another modified embodiment of the present invention, in its expanded orientation.

In FIG. 13, the device 210 is shown in its open, operational configuration. The device 210 includes a docking location 224 with a support plate 226 for accommodating a desired imaging device having a camera for imaging a document. The document to be imaged is placed on a document platform 248. The device is arranged so that the docking location 224 is disposed above the document platform at an optimal distance and angle to achieve excellent high resolution imaging results.

Figure 14:
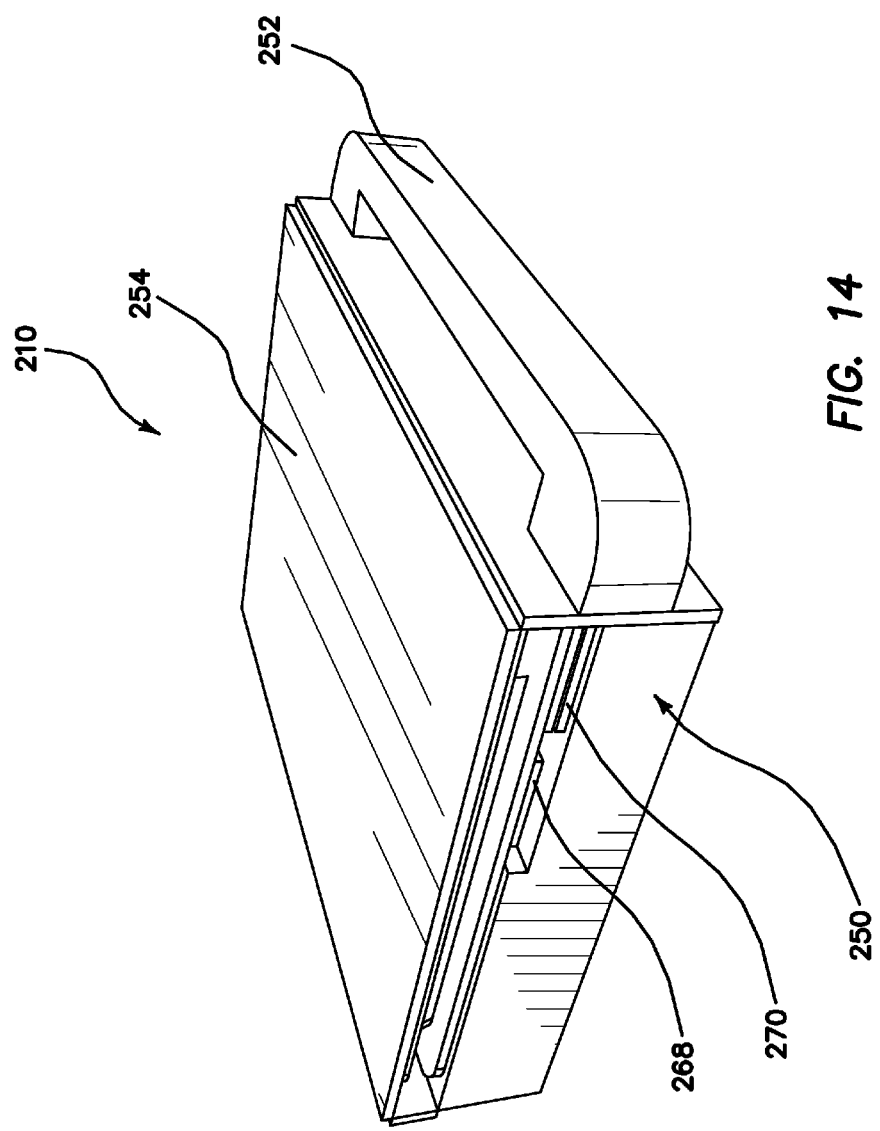
FIG. 14 is an isometric view of the embodiment of FIG. 13 in its collapsed orientation.

FIG. 14 shows the device 210 in its closed, inoperable configuration, suitable for easy transport or storage. In this configuration, the docking location and document platform are safely protected within a sturdy outside case 250, formed by re-configuring the structural parts of the device 210, as will be described below. A handle 252 is included for ready and convenient portability.

Figure 15:
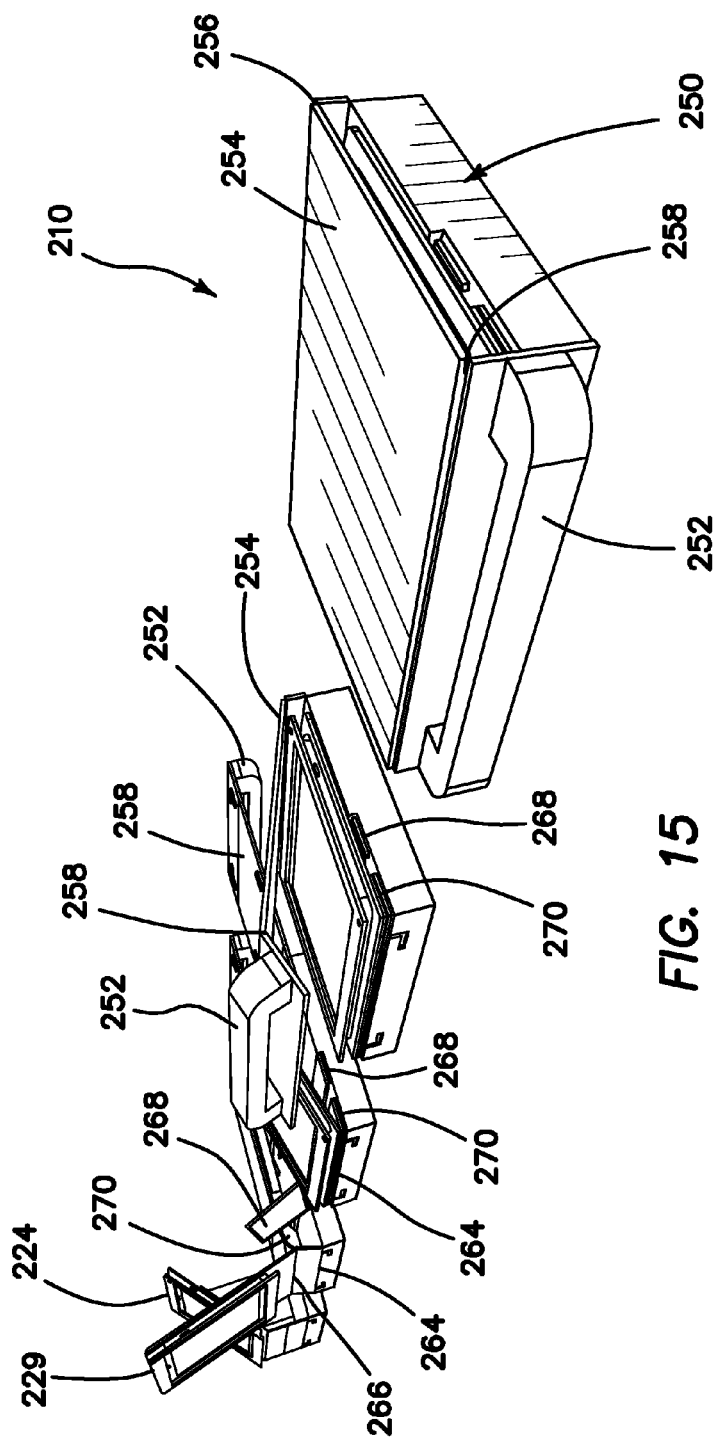
FIG. 15 is an isometric sequence showing the expansion of the FIGS. 13 and 14 embodiment from its collapsed orientation to its fully expanded orientation.
Figure 17:
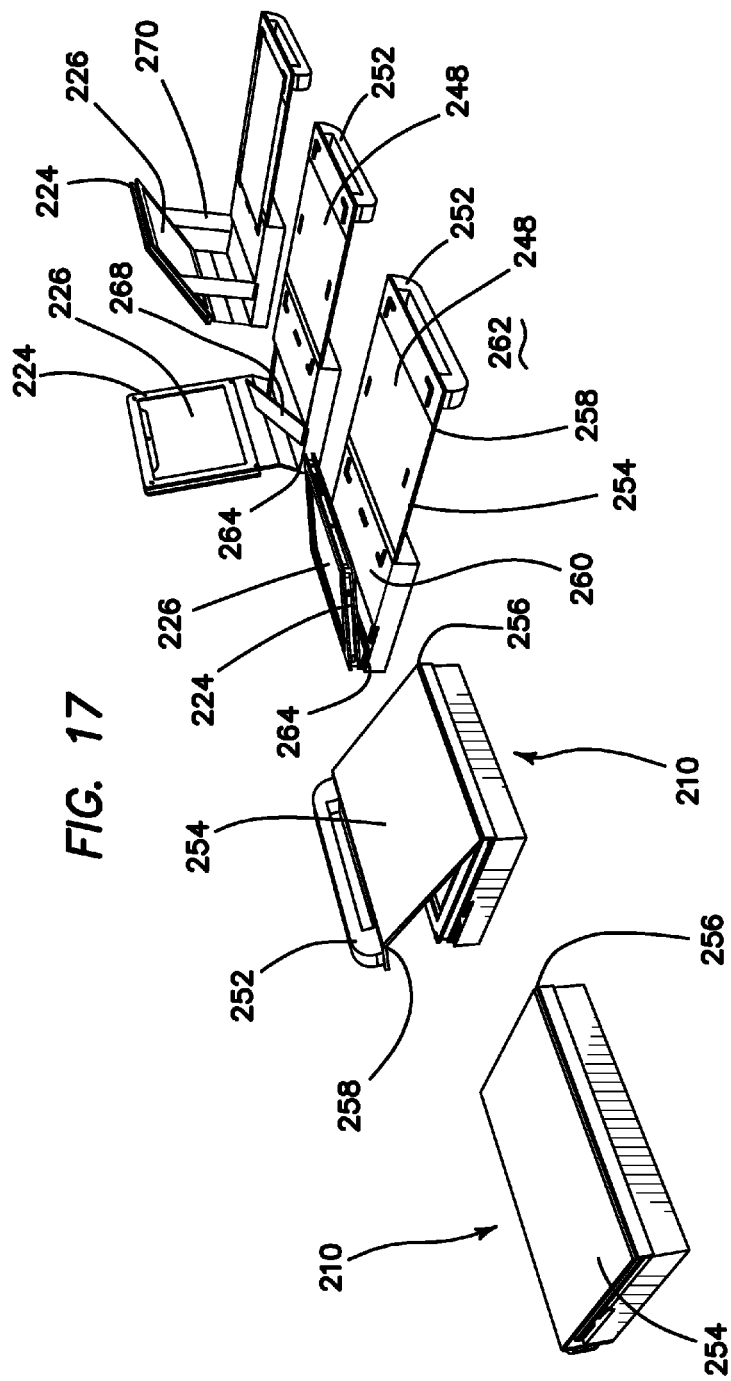
FIG. 17 is an isometric sequence similar to FIG. 15, shown from a slightly different perspective.

FIGS. 15 and 17 illustrate, sequentially from two different perspectives, a process according to the invention for re-configuring the inventive document scanning device 210 from its closed to its open and operable configuration. Beginning with the closed configuration of the device 210 shown in each figure, a first step involves lifting a top cover 254 upwardly and pivotally about its hinge 256, as shown in the next sequential drawing in each figure. At the same time, the handle 252 is pivoted upwardly about a separate hinge 258.

As shown in the next sequential drawing in each of FIGS. 15 and 17, the top cover 254 continues to be pivoted about the hinge 256 through an approximate 180 arc until it lies parallel to and extending from a surface 260 within an interior cavity defined by side panels of the case 250. The handle 252 is pivoted about the hinge 258 to extend from the cover 254, with the handle 252 contacting a table or counter surface 262 to support the entire structure 260, 254. So, the handle 252 doubles as a supporting member for the document platform 248, which in turn is the inside surface of the cover 254.

Now, referring to the next sequential drawing in each of FIGS. 15 and 17, the structure forming the docking location 224 and support plate 226 is now lifted up about yet another hinge 264, which, as can be seen in the following sequential drawing, actually preferably comprises a triple hinge, having a second hinge 266 and a third hinge 267 to maximize the operator's ability to locate the docking station 224 at an optimal imaging orientation. Support pillars 268, 270 are then folded upwardly and latched into an upright position for supporting the docking location 224 in a desired orientation relative to the document platform 248. Typically, one or more slots (not shown) may be provided on the docking location structure 224, to receive the upper ends of each of the support pillars 268, 270. These slots may be spaced along the surface of the docking location 224, if desired, to customize the orientation of the docking location 224 relative to the document platform 248. At this juncture, the document scanning system 210 is fully assembled and operational.

Figure 16:
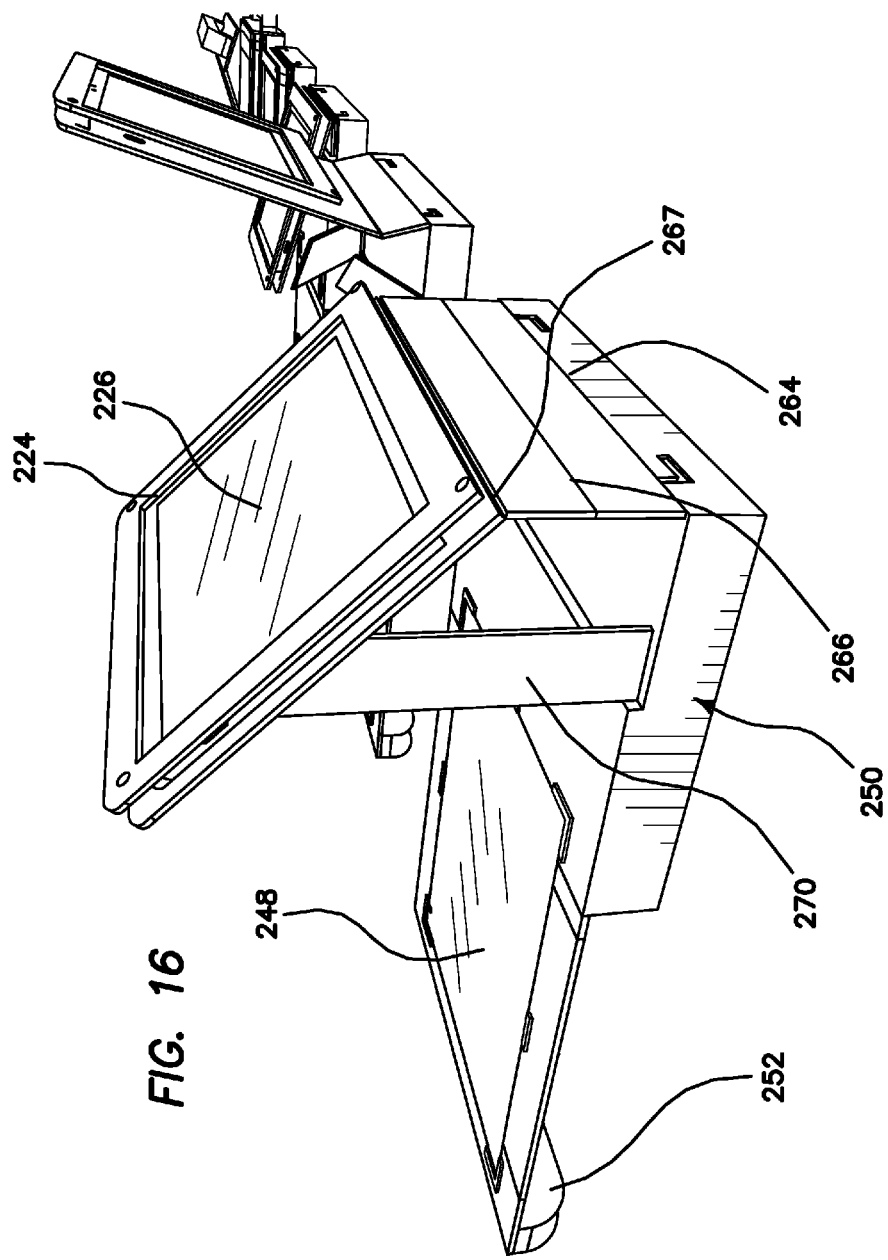
FIG. 16 is an isometric sequence similar to FIG. 15, but showing the collapse of the FIGS. 13 and 14 embodiment from its fully expanded orientation to its collapsed orientation.
Figure 18:
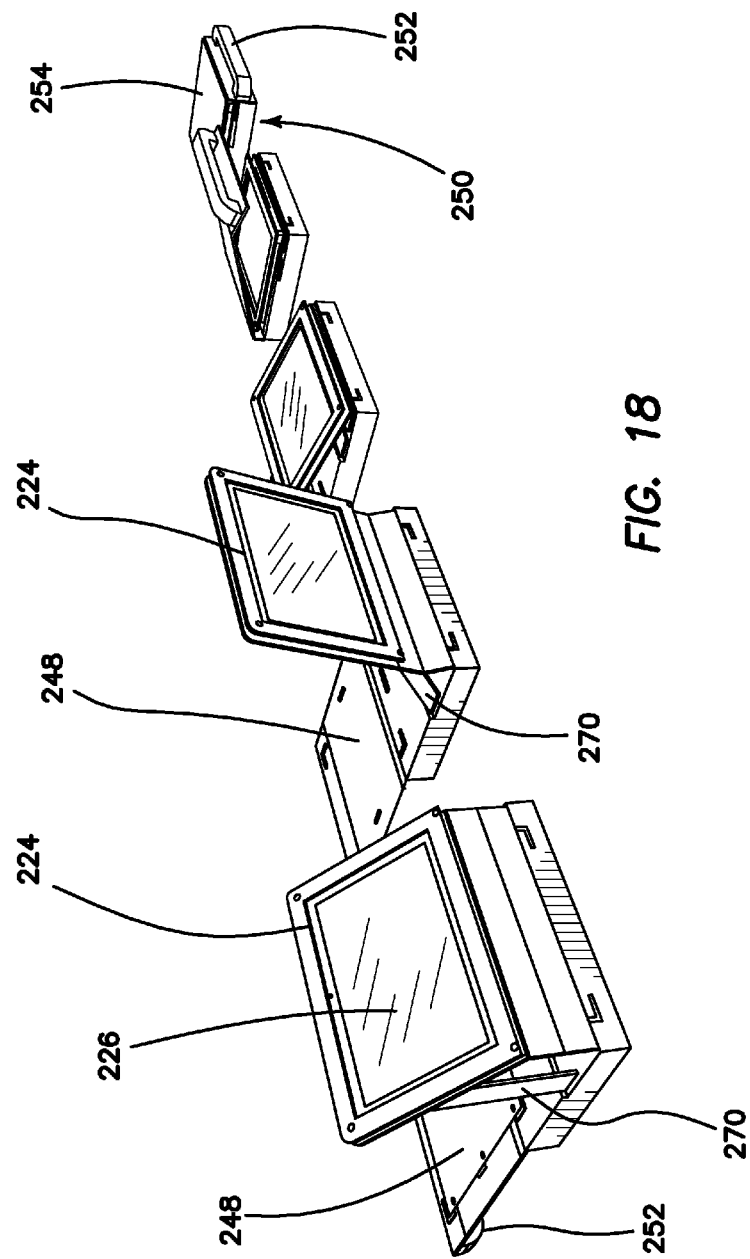
FIG. 18 is an isometric sequence similar to FIG. 16, but shown from the perspective of FIG. 17.

When the scanning jobs have been completed, and it is desired to collapse the system 210 for storage or transport, the assembly steps are reversed, as shown in FIGS. 16 and 18. Advantageously, the carrying case 250 created by executing the illustrated collapsing steps can also store the tablet p.c. or other imaging device, within the docking station 224, for convenience.

FIGS. 19-23 illustrate yet another embodiment 310 of the present invention, which bears a similarity particularly to the embodiment of FIGS. 13-18. In this embodiment, common elements to those in the previous embodiments shown in FIGS. 8-18 are identified by common reference numerals, preceded by the numeral "3".

In this embodiment 310, there are provided a lower portion 372 and an upper portion 374, shown in its collapsed orientation, whereby the upper portion 374 is folded to lie atop the lower portion 372 about a hinge 376. The docking location 324 and support plate 326 are disposed in the upper portion 374. A tablet accessory cut-out 327, like tablet accessory cut-out 34 of FIG. 1, is also provided.

Figure 20:
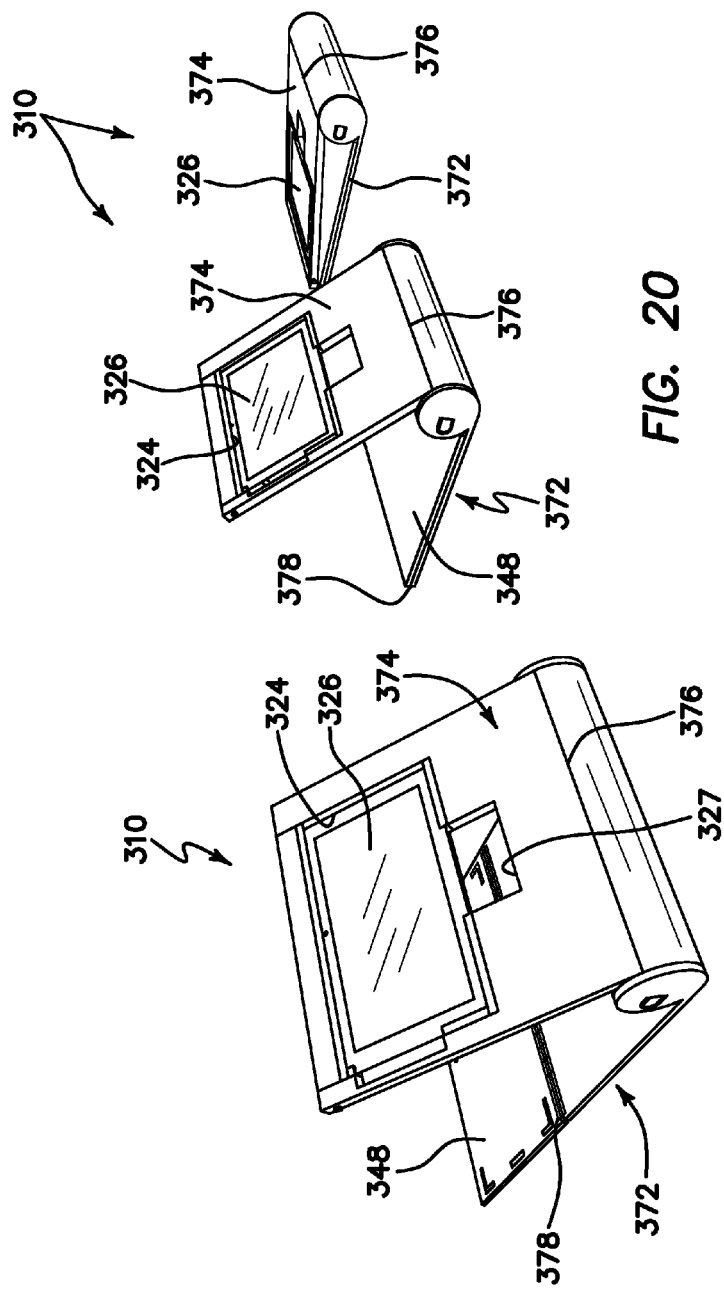
FIG. 20 is an isometric sequence showing the embodiment of FIG. 19 being collapsed from an expanded orientation to a collapsed orientation.

As shown in FIG. 20, when the device 310 is in an expanded configuration (left-most figure), the upper portion 374 is oriented toward the vertical direction, pivoted about the hinge 376, so that it is spaced from the lower portion 372. In this open orientation, a document platform 348 is disposed on part of the lower portion 372. In this expanded, operational orientation, the lower portion 372 lies flat on a table or other suitable horizontal surface. Operation of this embodiment is similar to that described in the prior embodiments. In particular, operation of this embodiment is very similar to that of the embodiment of FIGS. 13-18.

When operation is complete, and it is desired to collapse the unit 310 for storage or transport, it may be collapsed as shown in the two sequenced figures to the right of the left-most figure. As shown in the first of these two figures, a first step is to fold the document platform 348 over the remaining part of the lower device portion 372, about a hinge 378. By completing this folding step, the lower portion 372 is now equal in size to the upper portion 374. Then, as shown in the right-most figure, the upper portion 374 is folded over about the hinge 376, to close over the lower portion 372. A latch or other closure device may be used to secure the device 10 in this collapsed orientation.

Figure 21:
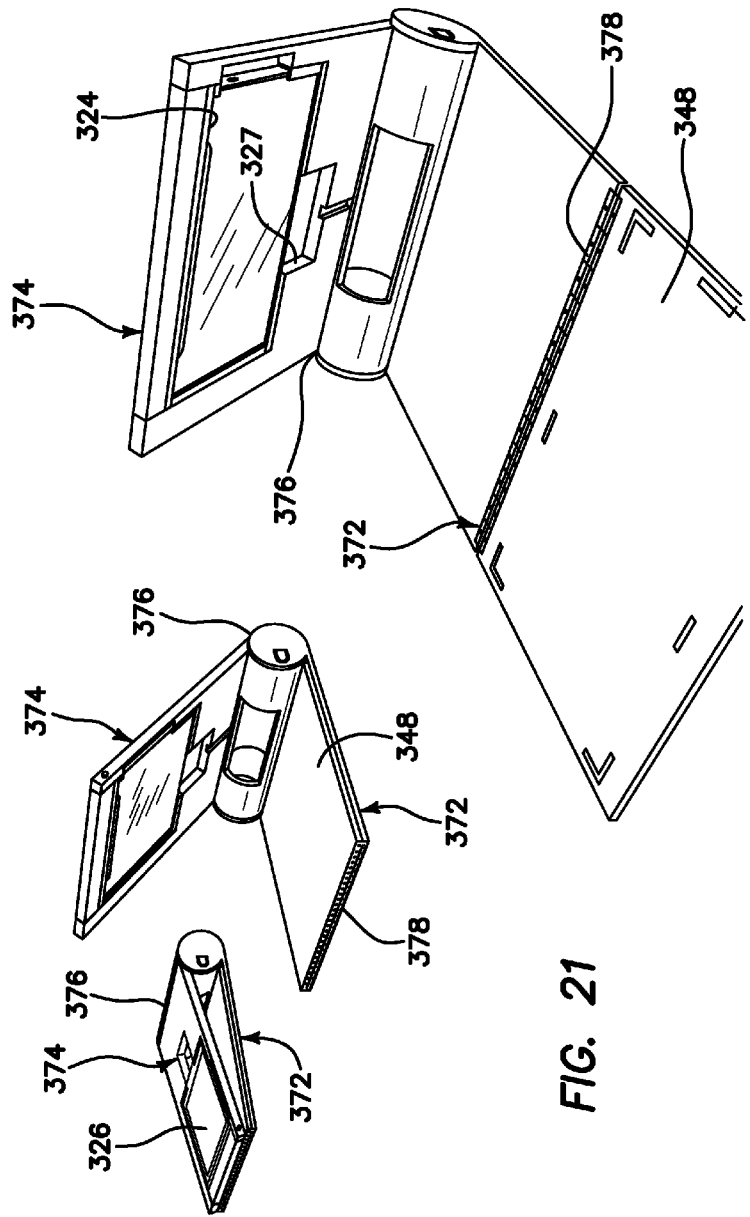
FIG. 21 is an isometric sequence similar to FIG. 19, but showing the embodiment of FIG. 12 being expanded from a collapsed orientation to an expanded orientation.
Figure 22:
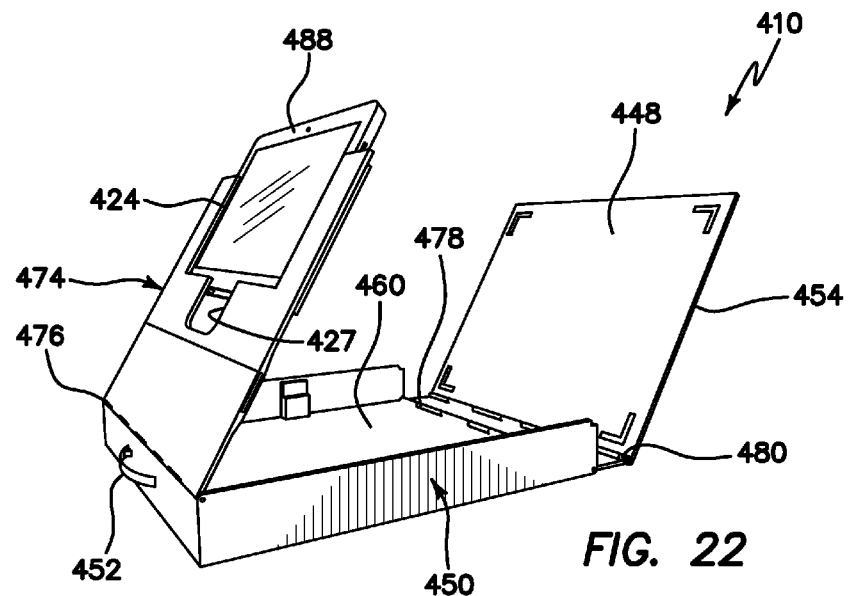
FIG. 22 is an isometric view of still another modified embodiment of the present invention.
Figure 23:
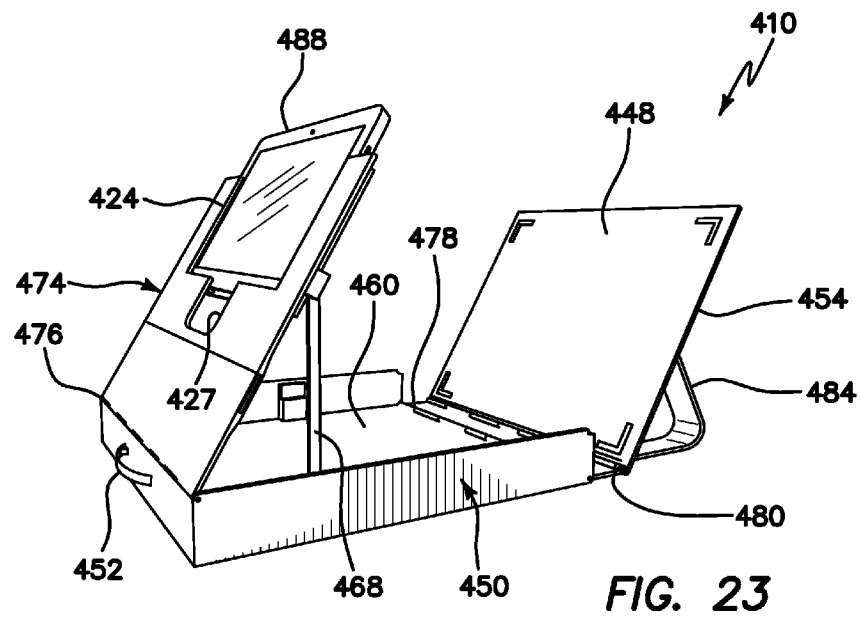
FIG. 23 is a view similar to FIG. 22 of the FIG. 22 embodiment, which has been modified slightly to eliminate support members.
Figure 24:
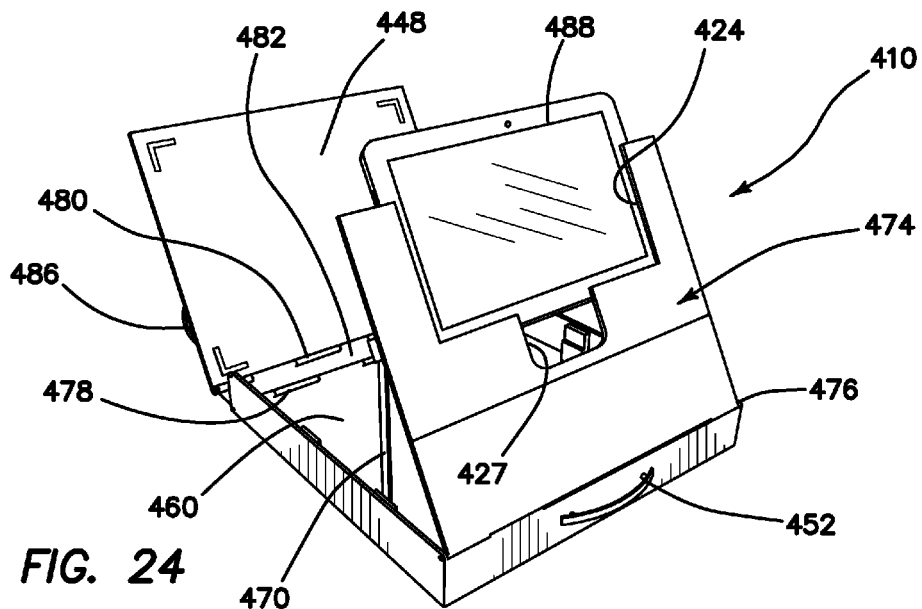
FIG. 24 is an isometric view of the FIG. 23 embodiment from a different orientation.
Figure 25:
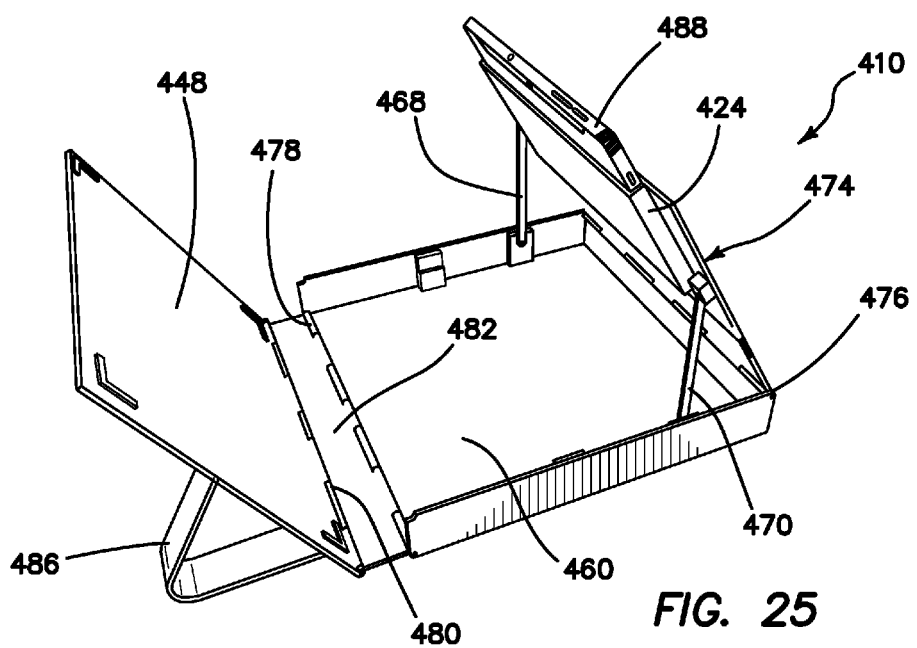
FIG. 25 is an isometric view of the FIG. 23 embodiment from yet another orientation.
Figure 28:
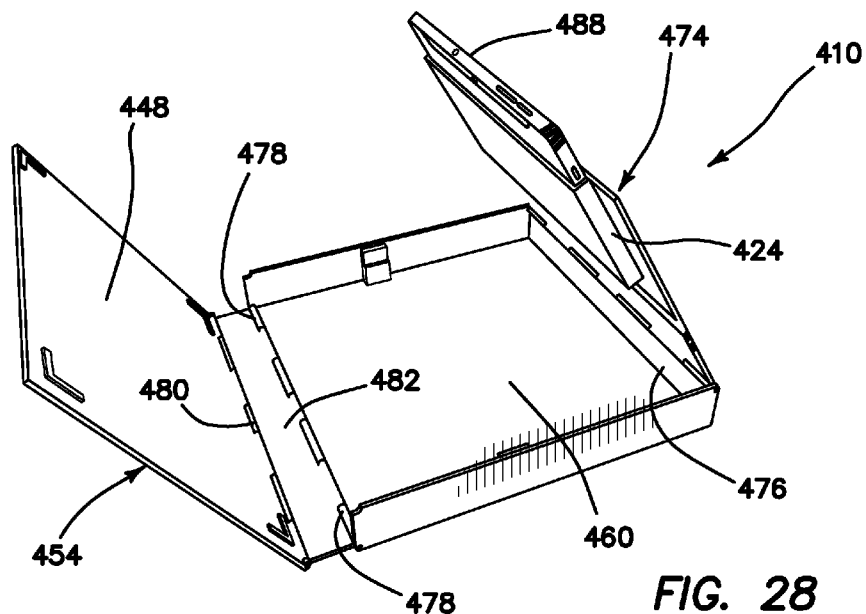
FIG. 28 is an isometric view of the FIG. 22 embodiment from yet another orientation.
Figure 29:
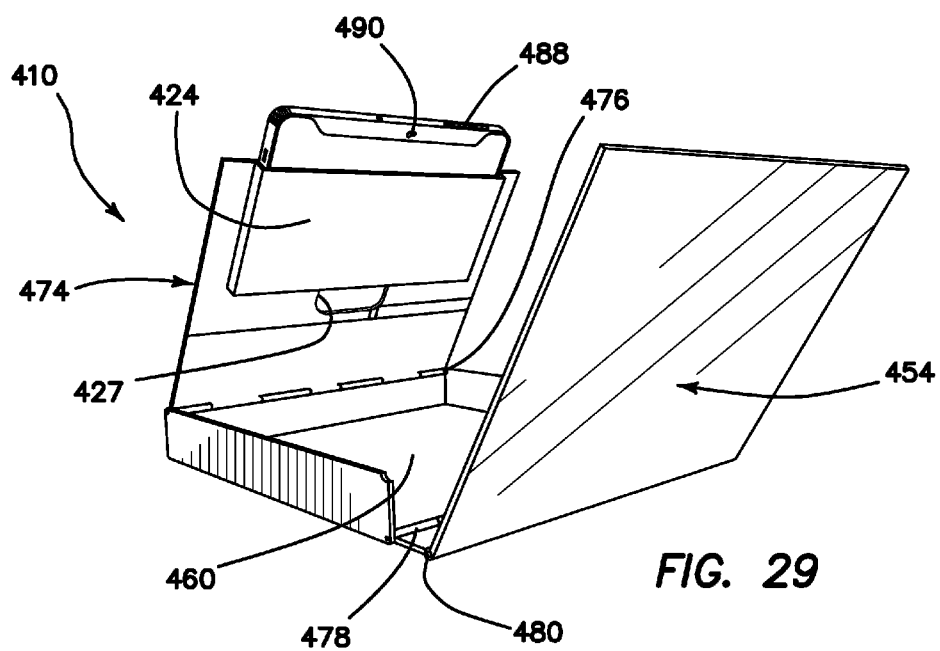
FIG. 29 is an isometric view of the FIG. 22 embodiment from still another orientation.

FIG. 21 shows a process sequentially, from left-to-right, whereby the device is expanded from its collapsed orientation (left-most figure) to its expanded orientation (right-most figure). This sequence is the same as shown in FIG. 20, but in reverse order.

Figure 19:
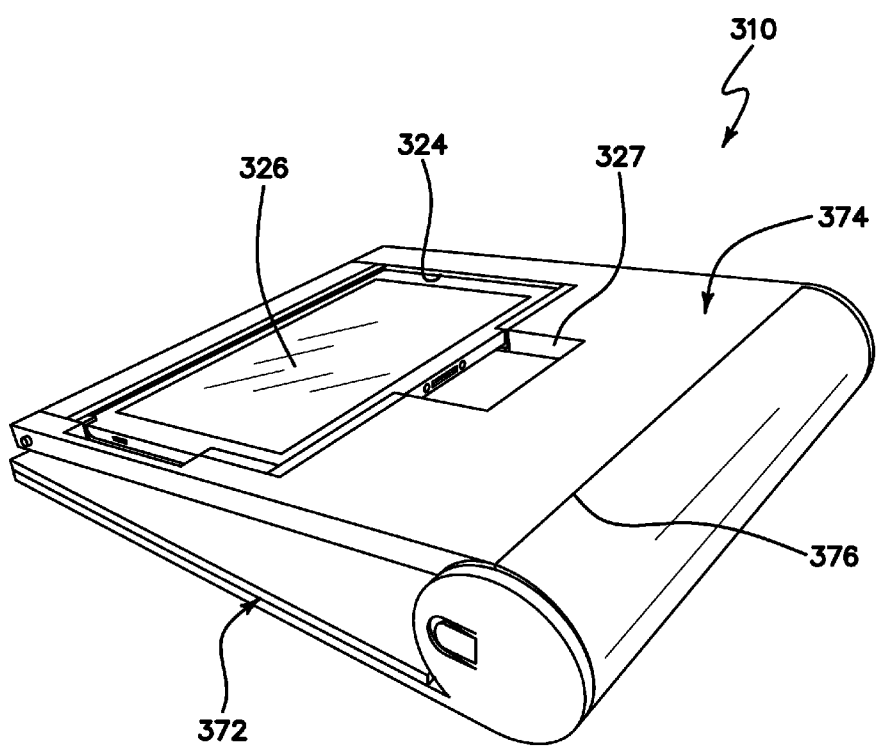
FIG. 19 is an isometric view of yet another modified embodiment of the present invention.

FIGS. 22-29 illustrate still another embodiment 410 of the present invention, wherein common elements to those in the previous embodiments shown in FIGS. 8-21, and particularly the embodiment shown in FIGS. 19-21, are identified by common reference numerals, preceded by the numeral "4". This embodiment is illustrated in two slightly different versions. The version shown in FIGS. 22 and 27-29 is a version that does not utilize support members, while the version of FIGS. 23-26 does. Otherwise, the two versions are substantially identical, and will be discussed as a single embodiment 410. This embodiment 410 is an open embodiment, as are the embodiments 210 and 310, relying on ambient light to image the document.

More particularly, as in the embodiment 310, the document scanning device 410 comprises an outside case 450 having an upper portion 474 and a top cover 454, when it is in its closed configuration (not illustrated), with a handle 452 provided for portability. Other elements in common with the embodiment 310 include a tablet accessory cut-out 427, document platform 448 on the top cover, a bottom surface 460 for the outside case 450, a hinge 476 for moving the upper portion 474 between its open and closed positions, and a hinge 478 for moving the top cover 454 between its open and closed positions. In this embodiment, a second hinge 480, spaced from the first hinge 478, also assists in opening and closing the top cover 454 relative to the case 450 as a whole, while also creating a side panel 482 for the case when closed.

As mentioned above, the embodiment 410 is illustrated in two slightly different versions. FIGS. 22 and 27-29 illustrate the embodiment 410 having no support members to hold the document platform 448 and upper portion 474 in place in the open and operational orientation. The support members can be eliminated because, in this version, the hinges 476 and 480 include stop points which function to support the document platform 448 and the upper portion 474 in their desired operational positions. FIGS. 23-26 illustrate an alternative version including support members or pillars 468 and 470 for supporting the upper portion 474 in its desired operational position and support members 484 and 486 for supporting the document platform 448 in its desired operational position.

A significant feature of the embodiment 410 is that the docking location 424 for accommodating a tablet personal computer/imaging device 488 having a camera 490 comprises a detachable faceplate, rather than a built-in fixed member as in the other embodiments. In this embodiment, a plurality of such detachable faceplates 424 are available, each customized to accommodate a particular brand or model of tablet p.c. or imaging device 488 and its unique camera location and orientation, to ensure an optimal viewing angle between the camera 490 and the document platform 448. It is noted that each of the prior embodiments 110, 210, 310 could similarly be modified to incorporate a detachable faceplate, customized to optimize imaging from a particular imaging device, if desired.

It should be noted that an auto-document feeder may optionally be included in all embodiments, if desired.

In all of the foregoing embodiments having hinges, the described hinges may be of any known type, including a simple crease which permits folding of the material about it, depending upon the constructional materials used, and other factors such as designed application.

Accordingly, although an exemplary embodiment of the invention has been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A collapsible document scanning device, comprising:
   a docking location for receiving and docking an image capturing device, comprising a detachable faceplate;
   a document platform spaced from said docking location for receiving a document to be scanned; and
   structure for supporting each of said docking location and said document platform in spaced relationship to one another in an expanded, operable configuration, said structure comprising a plurality of members which are movable to re-configure the structure from said expanded configuration to a collapsed configuration, in order to render the device inoperable and conveniently transportable or storable;
   wherein the detachable faceplate is adapted for ready attachment and detachment from the device, the detachable faceplate being particularly adapted for accommodation of a particularly configured image capturing device and being interchangeable with a differently configured detachable faceplate in the event a differently configured image capturing device is to be used.

2. The document scanning device as recited in claim 1, and further comprising a support plate adjacent to said docking location for supporting the image capturing device which has been inserted into said docking location.

3. The document scanning device as recited in claim 2, wherein the docking location comprises an aperture having a suitable size and shape for receiving the image capturing device.

4. The document scanning device as recited in claim 3, wherein the image capturing device comprises a tablet p.c.

5. The document scanning device as recited in claim 3, wherein the image capturing device comprises a smart phone.

6. The document scanning device as recited in claim 1, wherein said structure comprises a box having a front surface panel, a rear surface panel, a left surface panel, a right surface panel, a top surface panel, and a bottom surface panel, and said movable members comprise portions of some of said panels.

7. The document scanning device as recited in claim 1, wherein said structure is constructed to be open in said expanded configuration and said document platform comprises one of said movable members.

8. The document scanning device as recited in claim 7, wherein said device further comprises movable support pillars for supporting said docking location in spaced relationship to said document platform in said expanded configuration.

9. The document scanning device as recited in claim 7, and further comprising a handle for transporting said device when it is in said collapsed configuration, the handle becoming a support member in said expanded configuration for supporting said document platform.

10. A document scanning device, comprising:
a case comprising a plurality of side panels which define an interior cavity;
a docking location disposed on a first portion of said case, for receiving and docking an image capturing device; and
a document platform disposed on a second portion of said case, spaced from said first portion, for receiving a document to be scanned by an image capturing device disposed in said docking location;
wherein said document platform comprises a document insertion slot for receiving a document therein into the interior cavity, and further comprising a view plate adjacent to said document insertion slot for supporting a document inserted into said slot.

11. The document scanning device as recited in claim 10, and further comprising a support plate adjacent to said docking location for supporting the image capturing device which has been inserted into said docking location.

12. The document scanning device as recited in claim 11, wherein the docking location comprises an aperture having a suitable size and shape for receiving the image capturing device.

13. The document scanning device as recited in claim 10, and further comprising artificial lighting in said interior cavity for enhancing the scanning function.

* * * * *